(12) United States Patent
DeFrancesco et al.

(10) Patent No.: US 8,147,579 B2
(45) Date of Patent: Apr. 3, 2012

(54) DISPATCH CRITICAL FUEL TANK INERTING SYSTEM FOR AIRCRAFT

(75) Inventors: Gregory L. DeFrancesco, Simsbury, CT (US); Renaud Rebours, Ellington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 403 days.

(21) Appl. No.: 12/558,616

(22) Filed: Sep. 14, 2009

(65) Prior Publication Data
US 2010/0175900 A1 Jul. 15, 2010

Related U.S. Application Data

(60) Provisional application No. 61/204,863, filed on Jan. 12, 2009.

(51) Int. Cl.
*B01D 53/22* (2006.01)
*B64D 37/32* (2006.01)
(52) U.S. Cl. .............................. 55/418; 96/4; 244/135 R
(58) Field of Classification Search ................ 95/47, 54, 95/130, 14; 96/4, 108, 112, 121; 55/418, 55/420; 244/135 R
See application file for complete search history.

(56) References Cited

U.S. PATENT DOCUMENTS

| | | | |
|---|---|---|---|
| 5,069,692 A * | 12/1991 | Grennan et al. ................ 96/4 |
| 6,189,313 B1 | 2/2001 | Cass et al. |
| 6,547,188 B2 | 4/2003 | Schmutz et al. |
| 6,604,558 B2 | 8/2003 | Sauer |
| 6,820,659 B2 | 11/2004 | Sauer |
| 7,081,153 B2 | 7/2006 | Leigh et al. |
| 7,273,507 B2 | 9/2007 | Schwalm |
| 7,300,494 B2 | 11/2007 | Schwalm et al. |
| 7,306,644 B2 * | 12/2007 | Leigh et al. ................ 95/14 |
| 7,352,464 B2 | 4/2008 | Chen et al. |
| 7,509,968 B2 | 3/2009 | Surawski |
| 2007/0054610 A1 * | 3/2007 | Jensen ......................... 454/74 |
| 2008/0202511 A1 * | 8/2008 | Meckes et al. ........... 128/202.26 |

* cited by examiner

*Primary Examiner* — Frank Lawrence, Jr.
(74) *Attorney, Agent, or Firm* — Carlson, Gaskey & Olds, PC

(57) ABSTRACT

An air inerting system for supplying nitrogen-enriched air to a fuel tank on a vehicle includes an air separation module. The air separation module has an inlet for receiving air to separate oxygen, and an outlet for delivering nitrogen-enriched air to a downstream fuel tank on a vehicle. Downstream parallel flow lines of the outlet are each provided with a flow control valve. The downstream parallel flow lines reconnect downstream of the flow control valves to provide a source of nitrogen-enriched air to the fuel tank. An air supply line upstream of the air separation module supplies air to at least a pair of upstream parallel lines. Each of the upstream parallel lines are provided with a shut-off valve. The upstream parallel lines reconnect downstream of the shut-off valves to supply air to a heat exchanger. Air downstream of the heat exchanger passes to the air separation module.

15 Claims, 2 Drawing Sheets

DISPATCH CRITICAL FUEL TANK INERTING SYSTEM FOR AIRCRAFT

RELATED APPLICATION

This application claims priority to U.S. Provisional Patent Application 61/204,863, which was filed Jan. 12, 2009.

BACKGROUND OF THE INVENTION

This application relates to a fuel tank inerting system that is capable of working for greater periods of time than existing systems.

Aircraft are typically provided with fuel tanks for delivering fuel to the gas turbine engines. Recently, it has been proposed to supply inert air to the fuel tanks to reduce the risk of fire.

Typically, air separation modules are utilized which separate oxygen out of the air and deliver a nitrogen-enriched air to the fuel tanks. Flow systems associated with the modules typically include a supply line leading to the air separation module, and then downstream from the air separation module for delivering the nitrogen-enriched air to the fuel tank.

Currently, such systems are not required to operate 100% of the time that the aircraft is in flight. However, it may be desirable to increase the reliability of such systems such that they can operate for essentially the entire time an aircraft is in flight.

SUMMARY OF THE INVENTION

A fuel tank inerting system for supplying nitrogen-enriched air to a fuel tank on a vehicle includes an air separation module. The air separation module has an inlet for receiving air to separate oxygen, and an outlet for delivering nitrogen-enriched air to a downstream fuel tank on a vehicle. Downstream parallel flow lines out of the air separation module outlet are each provided with a flow control valve. The downstream parallel flow lines reconnect downstream of the flow control valves to provide a source of nitrogen-enriched air to the fuel tank. An air supply line upstream of the air separation module supplies air to at least a pair of upstream parallel lines. Each of the upstream parallel lines are provided with a shut-off valve. The upstream parallel lines reconnect downstream of the shut-off valves to supply air to a heat exchanger. Air downstream of the heat exchanger passes to the air separation module.

These and other features of the present invention can be best understood from the following specification and drawings, the following of which is a brief description.

DETAILED DESCRIPTION OF THE PREFERRED EMBODIMENT

Figure 1:
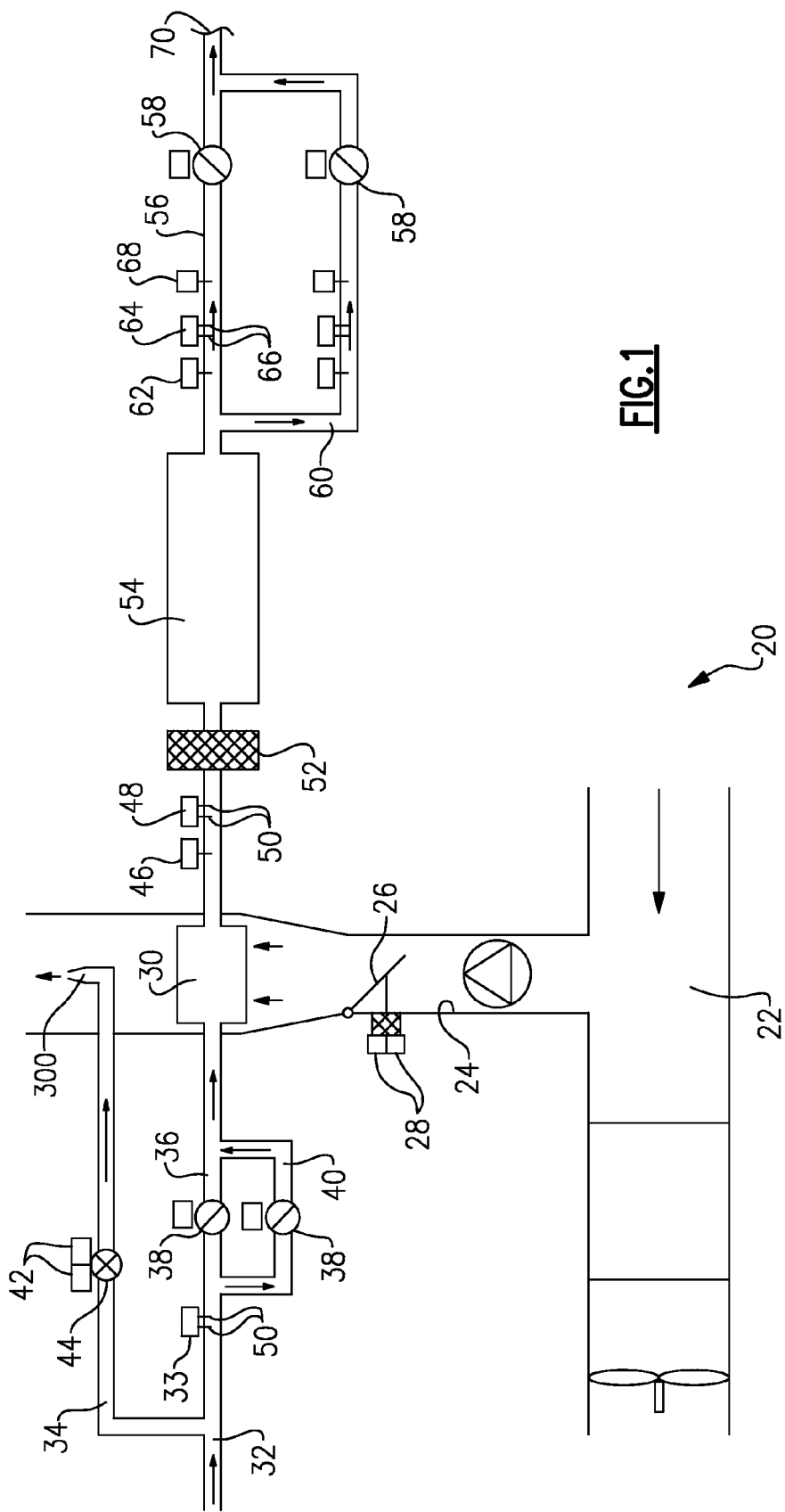
FIG. 1 is a schematic of a first inventive system.

An inerting system 20 is illustrated in FIG. 1 for delivering a nitrogen-enriched air to a fuel tank, such as on line 70. A ram air supply 22 delivers air into a duct 24 to cool an air supply at a heat exchanger 30. A damper valve 26 controls the flow of air through the duct 24 and over the heat exchanger 30. Motors 28 are provided to control a damper valve 26. The use of two motors 28 ensures that the failure of a single motor will not stop operation of the valve 26.

A bleed air supply 32 passes through a branch 34 to supply a venturi air jet 300 into the duct 24 downstream of the heat exchanger 30. A valve 44 controls the flow through the line 34, and includes redundant motors 42. A temperature sensor 33 includes redundant temperature probes 50.

Downstream of the line 32, the air supply breaks into parallel lines 36 and 40, each passing through a pressure regulator and shut-off valve 38. The pressure regulator and shut-off valves 38 are each "failure closed" valves. This means that should the valve fail, it will be biased to a closed position blocking flow. However, the use of the parallel lines 36 and 40, and the parallel valves 38 allows one of the two valves to have failed, while air is still delivered to the heat exchanger 30. Downstream of the heat exchanger 30, the air passes adjacent to a pressure probe 46, another temperature probe 48 having redundant probes 50, a filter 52, and into an air separation module 54.

As known, the air separation module is structured to allow the passage of oxygen outwardly to a use of oxygen, or to a dump to atmosphere (not shown). Downstream of the module 54, a nitrogen-enriched air is delivered into parallel lines 56 and 60. Each of these lines have an oxygen percentage probe 62, a temperature probe 64, and a pressure probe 68. Again, the temperature probe is provided with redundant probes 66. Shut-off valves 58 are provided on each of the lines 56 and 60. Again, should one of the valves 58 fail, it will move to a closed position. Still, the use of the parallel lines 56 and 60 will ensure that nitrogen-enriched air is still supplied to the line 70, which leads to the fuel tank.

Figure 2:
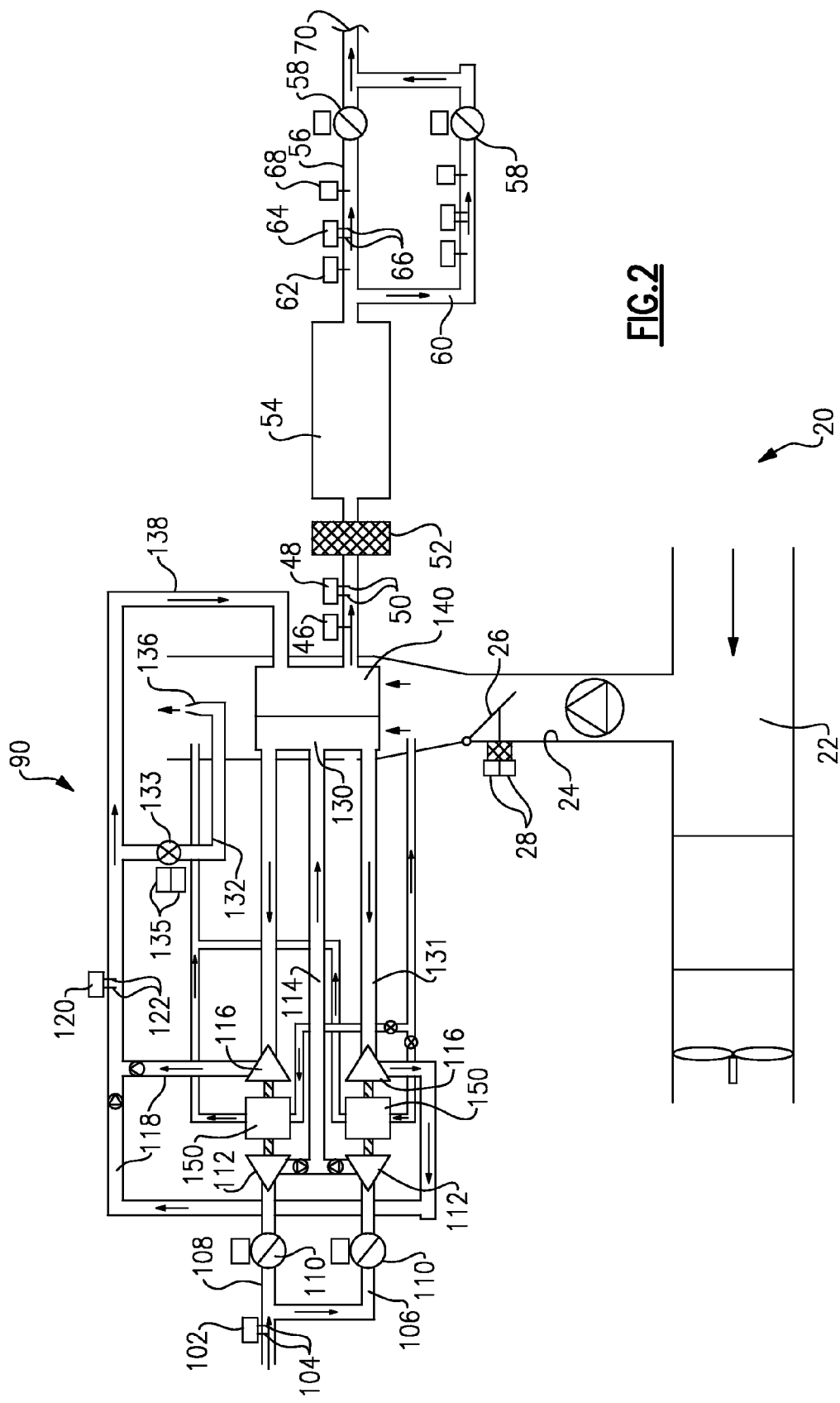
FIG. 2 is a schematic of a second inventive system.

FIG. 2 shows a second embodiment 90. In the second embodiment 90, everything downstream of the heat exchanger 140 may be basically identical to FIG. 1. Further, the flow of air through the duct 24 is also identical. However, the air 100 supplied to the air separation module passes into parallel lines 106 and 108 each provided with shut-off valves 110. Again, the shut-off valves 110 are failed-closed valves. Downstream of each valve 110, the air reaches a first stage compressor 112, passes through a line 114 to a cooler 130 in which the air is cooled by the air in the duct 24, along with the cooling of the air in the heat exchanger 140. Downstream of the cooler 130, the air passes through ducts 131 to a second stage compressor 116. An intermediate motor 150 drives the compressor stages 112 and 116. The air passes into ducts 118 downstream of the second stage compressors 116, passes a temperature sensor 120 provided with redundant probes 122, and into a branch line 132 with a shut-off valve 133 having redundant motors 135, and to a venturi jet 136. The bulk of the air in the lines 118 passes through a line 138 into the heat exchanger 140, and then downstream towards the filter and air separation module.

Although embodiments of this invention have been disclosed, a worker of ordinary skill in this art would recognize that certain modifications would come within the scope of this invention. For that reason, the following claims should be studied to determine the true scope and content of this invention.

What is claimed is:
1. An air inerting system for supplying a nitrogen-enriched air to a fuel tank on a vehicle comprising:
an air separation module having an inlet for receiving air to separate oxygen and made into a nitrogen-enriched air, and an outlet for delivering nitrogen-enriched air to a downstream fuel tank on a vehicle, and there being downstream parallel flow lines downstream of said outlet, with each of said downstream parallel lines being provided with a flow control valve, and said downstream parallel lines reconnecting downstream of said flow valves to provide a source of nitrogen-enriched air to the fuel tank; and an air supply line upstream of said air separation module, and said air supply line supplying air to at least a pair of upstream parallel lines, each of said upstream parallel lines being provided with a shut-off valve, and said upstream parallel lines reconnecting downstream of said shut-off valves to supply air to a heat exchanger, air downstream of said heat exchanger passing to said air separation module.

2. The system as set forth in claim 1, wherein temperature sensors are provided on at least one of said upstream and downstream parallel lines, with said temperature sensor being provided with a pair of probes.

3. The system as set forth in claim 2, wherein a first temperature sensor is provided upstream of said upstream parallel lines, and a second temperature sensor is provided intermediate said heat exchanger and said air separation module, and a third temperature sensor is provided downstream of said air separation module, with each of said first, second, and third temperature sensors being provided with redundant probes.

4. The system as set forth in claim 3, wherein said third temperature sensor includes a third and fourth temperature sensor, with one of said third and fourth temperature sensors being mounted in each of said downstream parallel lines.

5. The system as set forth in claim 1, wherein said heat exchanger cools the air passing to said air separation module, and said heat exchanger received in a duct.

6. The system as set forth in claim 5, wherein a damper valve controls the amount of cooling air passing through said duct over said heat exchanger, and said valve being provided with a pair of motors.

7. The system as set forth in claim 6, wherein a tap line taps a portion of air leading to said heat exchanger as an injector air to be injected into said duct.

8. The system as set forth in claim 7, wherein a shut-off valve is provided on said tap line, and said shut-off valve being provided with a pair of redundant motors.

9. The system as set forth in claim 1, wherein the shut-off valves in said upstream and downstream flow lines are each failure closed valves which are biased to a closed position when said valve fails.

10. The system as set forth in claim 1, wherein air being delivered to said heat exchanger passes to a compressor mounted in each of said upstream parallel flow lines.

11. The system as set forth in claim 10, wherein said compressors are positioned downstream of said shut-off valves.

12. The system as set forth in claim 11, wherein said compressor includes a pair of compressor stages, with air delivered from a lower compression stage, then being delivered to a higher compression stage in each of said upstream parallel flow lines.

13. The system as set forth in claim 12, wherein air passes from said lower compression stage through a cooler, said cooler being placed in the path of cooling air, such that air in said cooler is cooled before being delivered to said higher compression stage.

14. The system as set forth in claim 13, wherein air from said higher compression stage then passing through said heat exchanger before being delivered into said air separation module.

15. The system as set forth in claim 14, wherein both said cooler and said heat exchanger are positioned in a common duct.

* * * * *